US011974161B2

(12) United States Patent
Karampatsis et al.

(10) Patent No.: US 11,974,161 B2
(45) Date of Patent: Apr. 30, 2024

(54) VALIDITY NOTIFICATION FOR A MACHINE LEARNING MODEL

(71) Applicants: Lenovo (Singapore) Pte. Ltd., New Tech Park (SG); Dimitrios Karampatsis, Ruislip (GB); Ishan Vaishnavi, Munich (DE)

(72) Inventors: Dimitrios Karampatsis, Ruislip (GB); Ishan Vaishnavi, Munich (DE)

(73) Assignee: Lenovo (Singapore) Pte. Ltd., New Tech Park (SG)

(*) Notice: Subject to any disclaimer, the term of this patent is extended or adjusted under 35 U.S.C. 154(b) by 0 days.

(21) Appl. No.: 18/247,722

(22) PCT Filed: Oct. 2, 2020

(86) PCT No.: PCT/EP2020/077733
§ 371 (c)(1),
(2) Date: Apr. 3, 2023

(87) PCT Pub. No.: WO2022/069063
PCT Pub. Date: Apr. 7, 2022

(65) Prior Publication Data
US 2023/0345297 A1    Oct. 26, 2023

(51) Int. Cl.
*G06F 15/16* (2006.01)
*H04L 41/16* (2022.01)
*H04W 28/02* (2009.01)

(52) U.S. Cl.
CPC ......... *H04W 28/0268* (2013.01); *H04L 41/16* (2013.01)

(58) Field of Classification Search
CPC ..................... H04L 41/16; H04W 28/0268
(Continued)

(56) References Cited

U.S. PATENT DOCUMENTS 11,257,073 B2 * 2/2022 Padmanabhan ........... H04L 9/50
11,562,225 B2 * 1/2023 Xue .................... G06F 18/2148
(Continued)

FOREIGN PATENT DOCUMENTS

WO    2019158218 A1    8/2019

OTHER PUBLICATIONS

PCT/EP2020/077733, "Notification of Transmittal of the International Search Report and the Written Opinion of the International Searching Authority, or the Declaration", International Searching Authority, dated Jun. 18, 2021, pp. 1-12.
(Continued)

*Primary Examiner* — Moustafa M Meky
(74) *Attorney, Agent, or Firm* — Kunzler Bean & Adamson

(57) ABSTRACT

Apparatuses, methods, and systems are disclosed for providing analytics feedback for a network function. One apparatus includes a network interface that receives a first request for a trained machine learning ("ML") model from a network function ("NF") that supports analytics generation. Here, the first request contains first information including an Analytic Identifier ("ID"). The apparatus includes processor that determines a first trained ML model based on the first information and provides the first trained ML model to the NF. The processor determines that the first trained ML model is invalid and notifies the NF that the validity of the first trained ML model has changed.

20 Claims, 7 Drawing Sheets

(58) Field of Classification Search
USPC .......................................................... 709/223
See application file for complete search history.

(56) References Cited

U.S. PATENT DOCUMENTS

| | | | | |
|---|---|---|---|---|
| 11,640,462 | B2* | 5/2023 | Shrestha | G08B 29/188 |
| | | | | 348/156 |
| 11,651,374 | B2* | 5/2023 | Singh | G06Q 20/4016 |
| | | | | 705/45 |
| 11,681,610 | B2* | 6/2023 | Chang | G06F 11/3688 |
| | | | | 714/26 |
| 2020/0050766 | A1* | 2/2020 | Bos | G06F 21/577 |
| 2020/0167639 | A1* | 5/2020 | Xue | G06F 18/217 |
| 2020/0304378 | A1 | 9/2020 | Choi et al. | |
| 2021/0216893 | A1* | 7/2021 | Roden | G06N 5/04 |
| 2021/0279577 | A1* | 9/2021 | West | G06N 3/045 |
| 2021/0357316 | A1* | 11/2021 | Chang | G06N 20/00 |
| 2022/0044149 | A1* | 2/2022 | Rand | G06V 10/7747 |
| 2022/0121994 | A1* | 4/2022 | Sun | G06N 20/00 |
| 2023/0306263 | A1* | 9/2023 | Zou | G06F 16/285 |
| | | | | 706/20 |

OTHER PUBLICATIONS

3GPP, "3rd Generation Partnership Project; Technical Specification Group Services and System Aspects; Service requirements for cyber-physical control applications in vertical domains; Stage 1 (Release 17)", 3GPP TS 22.104 V17.3.0, Jul. 2020, pp. 1-76.

3GPP, "3rd Generation Partnership Project; Technical Specification Group Services and System Aspects; Enhancement of 3GPP support for V2X scenarios; Stage 1 (Release 16)", 3GPP TS 22.186 V16.2.0, Jun. 2019, pp. 1-18.

3GPP, "3rd Generation Partnership Project; Technical Specification Group Services and System Aspects; System architecture for the 5G System (5GS); Stage 2 (Release 16)", 3GPP TS 23.501 V16.5.0, Jul. 2020, pp. 1-441.

3GPP, "3rd Generation Partnership Project; Technical Specification Group Services and System Aspects; Procedures for the 5G System (5GS); Stage 2 (Release 16)", 3GPP TS 23.502 V16.5.0, Jul. 2020, pp. 1-594.

* cited by examiner

VALIDITY NOTIFICATION FOR A MACHINE LEARNING MODEL

The subject matter disclosed herein relates generally to wireless communications and more particularly relates to network data analytics and machine learning model validation.

BACKGROUND

The following abbreviations and acronyms are herewith defined, at least some of which are referred to within the following description.

Third Generation Partnership Project ("3GPP"), Fifth-Generation Core ("5GC"), Application Function ("AF"), Access and Mobility Management Function ("AMF"), Access Network ("AN"), Access Point Name ("APN"), Application Server ("AS"), Application Programing Interface ("API"), Data Network Access Identifier ("DNAI"), Data Network Name ("DNN"), Downlink ("DL"), Enhanced Mobile Broadband ("eMBB"), Evolved Node-B ("eNB"), Evolved Packet Core ("EPC"), Evolved UMTS Terrestrial Radio Access Network ("E-UTRAN"), Home Subscriber Server ("HSS"), Identifier ("ID"), IP Multimedia Subsystem ("IMS," aka "IP Multimedia Core Network Subsystem"), Internet Protocol ("IP"), Long Term Evolution ("LTE"), LTE Advanced ("LTE-A"), Medium Access Control ("MAC"), Machine Learning ("ML"), Mobile Network Operator ("MNO"), Mobility Management Entity ("MME"), Non-Access Stratum ("NAS"), Narrowband ("NB"), Network Function ("NF"), Network Access Identifier ("NAI"), Next Generation (e.g., 5G) Node-B ("gNB"), Next Generation Radio Access Network ("NG-RAN"), New Radio ("NR"), Network Data Analytics Function ("NWDAF"), Operations, Administration and Maintenance ("OAM"), Policy Control Function ("PCF"), Packet Data Network ("PDN"), Packet Data Unit ("PDU"), PDN Gateway ("PGW"), Public Land Mobile Network ("PLMN"), Quality of Service ("QoS"), Radio Access Network ("RAN"), Radio Access Technology ("RAT"), Radio Resource Control ("RRC"), Receive ("Rx"), Single Network Slice Selection Assistance Information ("S-NSSAI"), Serving Gateway ("SGW"), Session Management Function ("SMF"), Tracking Area Identifier ("TAI"), Transmission Control Protocol ("TCP"), Transmit ("Tx"), Unified Data Management ("UDM"), User Entity/Equipment (Mobile Terminal) ("UE"), Uplink ("UL"), User Plane ("UP"), Universal Mobile Telecommunications System ("UMTS"), User Datagram Protocol ("UDP"), Wireless Local Area Network ("WLAN"), and Worldwide Interoperability for Microwave Access ("WiMAX").

In certain mobile communication networks, network data analytics may be performed by a Network Data Analytics Function ("NWDAF"). The NWDAF provides analytics info to the core network and other consuming entities. The Analytics that the NWDAF provides are based on training a Machine Learning ("ML") model with data collected from the relevant Data Producer Network Function ("NFs"). For each analytics output, identified by an Analytic ID, there is a specific ML model used. The NWDAF uses the trained model to provide statistics or prediction to a Consumer's request. However, a problem that arises is that in certain scenarios the data collected by the NWDAF to train an ML model by various sources may not be valid anymore.

BRIEF SUMMARY

Methods for providing Analytics feedback for a network function are disclosed. In various embodiments, the disclosed methods are computer-implemented using a processor and machine-readable code. Apparatuses and systems also perform the functions of the methods.

One method of a first NF includes receiving a first request for a trained ML model from a second NF that supports analytics generation, the first request containing first information including an Analytic ID. The method includes determining a first trained ML model based on the first information and providing the first trained ML model to the second NF. The method includes determining that the first trained ML model is invalid and notifying the second NF that the validity of the first trained ML model has changed. As a consequence, a consumer NF may carry out a wrong action based on the previously "invalid" provided analytics.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
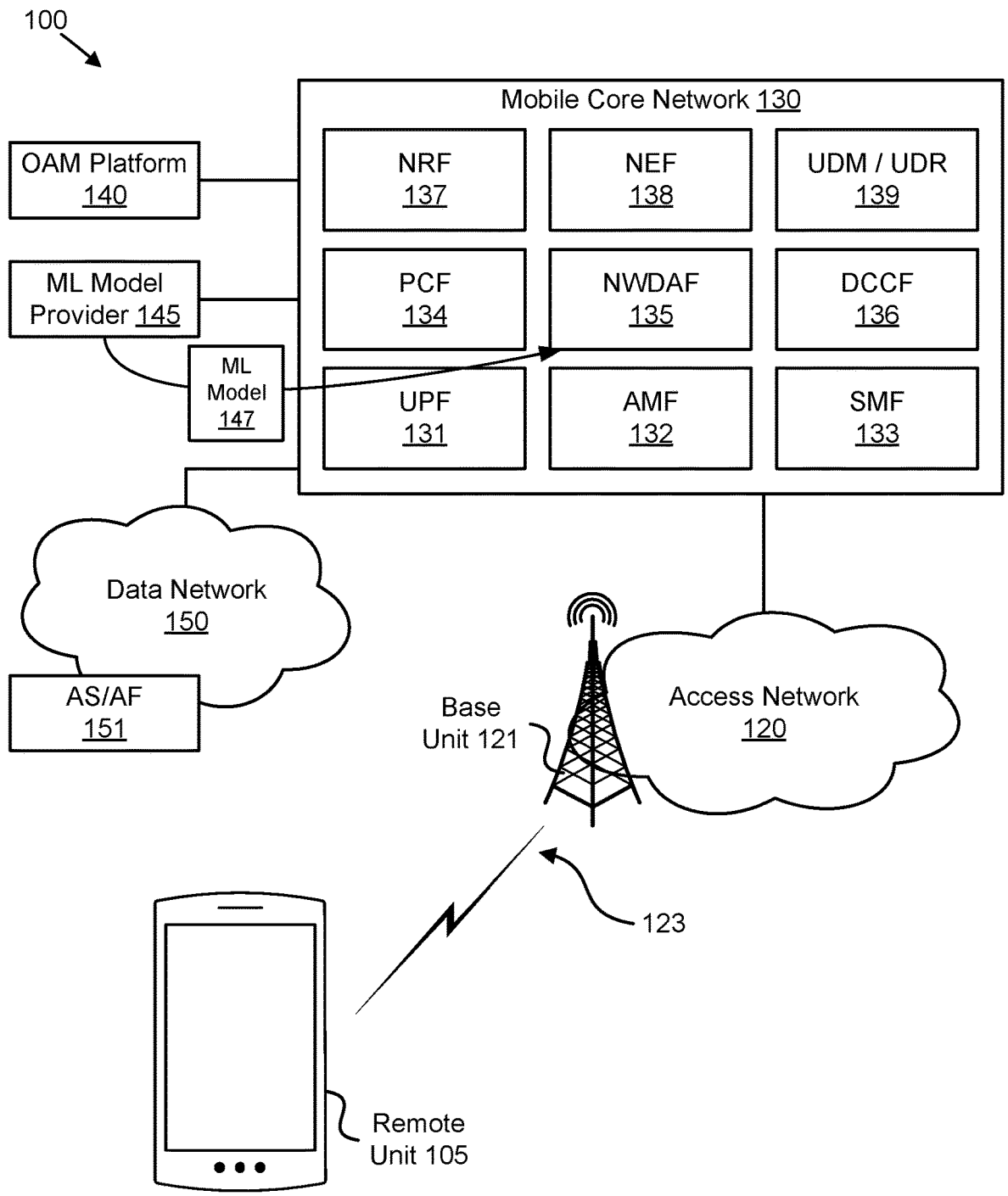
FIG. 1 is a diagram illustrating one embodiment of a wireless communication system for providing Analytics feedback for a network function.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed for providing Analytics feedback for a network function, specifically for validity notifications relating to a trained Machine Learning ("ML") model used to derive network analytics. As discussed above, the mobile communication network may deploy a network data analytics function ("NWDAF") that provides analytics info to the core network and other consuming entities. The Analytics that the NWDAF provides are based on training an ML model with data collected from the relevant Data Producer NFs. For each analytics output, identified by an Analytic ID there is a specific ML model used. The NWDAF uses the trained model to provide statistics or prediction to an NF's request. The requesting NF is referred to as "Consumer NF." For example, a consumer NF—or Application Function ("AF")—may request analytics information and prove an Analytic ID and parameters with the request. A Consumer NF may ask for analytics either in form of statistics or predictions.

The NWDAF derives the analytics by collecting relevant data from NFs. Candidate NFs include application functions, network exposure functions, control plane NFs, user plane functions, OAM, and the like. For example, the NWDAF derives statistics or predictions for UE location by collecting location changes events from the AMF. The NWDAF retrieves the related data from the NFs by using the Event Exposure Subscribe/Notify service operation. The NWDAF subscribes from the NF to retrieve specific data by including an Event ID (e.g., Location Changes). The NF/AFs then Notifies the NWDAF when the "Event" takes place. For example, an AMF NF notifies the NWDAF that the UE location changed. The NWDAF uses various data processing techniques to derive analytics information from the collected data and reports the analytics to the requesting NF.

When the NWDAF provides analytics to a consumer NF the NWDAF includes: 1) a Timestamp of analytics generation, which allows consumers to decide until when the received information shall be used. For instance, an NF can deem a received notification from NWDAF for a given feedback as invalid based on this timestamp; 2) a Validity period, which defines the time period for which the analytics information is valid; and 3) a Probability assertion: confidence in prediction (based on preferred level of accuracy requested by the consumer NF).

However, a problem that arises is that in certain scenarios the data collected by the NWDAF to train an ML model by various sources may not be valid anymore. Examples include, but are not limited to, A) When NWDAF derives analytics for NF load, an OAM platform may change the resources for a Network Function that affects its Load status; B) When the NWDAF derives analytics for UE communication pattern, an AF may indicate that provided Expected UE Communication Pattern has changed; C) When the NWDAF derives analytics for Observed Service Experience, an AF may indicate Location of Application represented by a list of Data Network Access Identifier(s) ("DNAI(s)") has changed; and D) An NWDAF may receive indication that service parameters have changed. For example, a DNN name or S-NSSAI has been updated.

In addition, an NWDAF may receive an updated initial ML model for analytics generation which may invalidate a previously trained ML model. The new initial ML model will require re-training with data collected from the relevant NFs.

One consequence is that the validity period and/or probability assertion of previously provided analytics by the NWDAF will change since these were based using an out-of-date trained ML model. Another consequence is that a consumer NF may carry out a wrong action based on the previously "invalid" provided analytics. For example, an SMF collecting analytics for UPF load from the NWDAF may determine, based on the previously provided analytics, that a UPF load is high in certain time of day and may act to select a different UPF that has lower load. However, if additional resources are added to the first UPF and the NWDAF informs the consumer NF that the previously provided analytics are incorrect the SMF may decide to not take an action until new "correct" analytics are provided.

As described in detail below, the NWDAF may determine a trained ML model used to derive analytics is not valid anymore/requires re-training. Also described are procedures for the NWDAF to inform an NF that Analytics provided are out of date.

Currently, when an AF is an external entity to a PLMN the interaction between the AF and the network is via a Network Exposure Function ("NEF"). The NEF supports external exposure of capabilities of network functions including for monitoring occurrences of Events. Examples of the type of observed Events supported by NWDAF may include, but are not limited to, Load level of a network slice instance; Service experience for an application or for a network slice; NF load analytics information for a specific NF or a list of NFs; Network performance in an area of interest; Mobility related information (i.e., statistics or predictions) for a group of UEs or a specific UE; Communication pattern information (i.e., statistics or predictions) for a group of UEs or a specific UE; Expected behavior information for a group of UEs or a specific UE; Abnormal behavior information for a group of UEs or a specific UE; Congestion information of user data in a specific location; and QoS sustainability (for a certain area and time period, reports QoS change statistics or predicts the likelihood of a QoS change).

FIG. 1 depicts a wireless communication system 100 for providing Analytics feedback for a network function, according to embodiments of the disclosure. In one embodiment, the wireless communication system 100 includes at least one remote unit 105, at least one base unit 121, at least one access network ("AN") 120, and a mobile core network 130 in a PLMN. The AN 120 may be composed of at least one base unit 121. The remote unit 105 may communicate with the access network 120 using 3GPP communication links and/or non-3GPP communication links, according to a radio access technology deployed by the AN 120. Even though a specific number of remote units 105, base units 121, ANs 120, and mobile core networks 130 are depicted in FIG. 1, one of skill in the art will recognize that any number of remote units 105, base units 121, ANs 120, and mobile core networks 130 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE/EPC (referred as 4G) or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 121 in the access network 120 via uplink ("UL") and downlink ("DL") communication signals. Furthermore, the UL and DL communication signals may be carried over the communication links 123. Note, that the access network 120 is an intermediate network that provide the remote units 105 with access to the mobile core network 130.

In some embodiments, the remote units 105 communicate with an application server and/or application function ("AS/AF") 151 (or other communication peer) via a network connection with the mobile core network 130. For example, an application in a remote unit 105 (e.g., web browser, media client, telephone/VoIP application) may trigger the remote unit 105 to establish a PDU session (or other data connection) with the mobile core network 130 using the access network 120. The mobile core network 130 then relays traffic between the remote unit 105 and the AS/AF 151 (e.g., in the data network 150) using the PDU session. Note that the remote unit 105 may establish one or more PDU sessions (or other data connections) with the mobile core network 130. As such, the remote unit 105 may have at least one PDU session for communicating with the data network 150. The remote unit 105 may establish additional PDU sessions for communicating with other data networks and/or other communication peers.

The base units 121 may be distributed over a geographic region. In certain embodiments, a base unit 121 may also be referred to as an access terminal, an access point, a base, a base station, a Node-B, an eNB, a gNB, a Home Node-B, a relay node, a device, or by any other terminology used in the art. The base units 121 are generally part of a radio access network ("RAN"), such as the access network 120, that may include one or more controllers communicably coupled to one or more corresponding base units 121. These and other elements of radio access network are not illustrated but are well known generally by those having ordinary skill in the art. The base units 121 connect to the mobile core network 130 via the access network 120.

The base units 121 may serve a number of remote units 105 within a serving area, for example, a cell or a cell sector, via a communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the communication links 123. The communication links 123 may be any suitable carrier in licensed or unlicensed radio spectrum. The communication links 123 facilitate communication between one or more of the remote units 105 and/or one or more of the base units 121.

In one embodiment, the mobile core network 130 is a 5G core ("5GC") or an evolved packet core ("EPC"), which may be coupled to a data network (e.g., the data network 150, such as the Internet and private data networks, among other data networks). A remote unit 105 may have a subscription or other account with the mobile core network 130. The present disclosure is not intended to be limited to the implementation of any particular wireless communication system architecture or protocol.

The mobile core network 130 includes several network functions ("NFs"). As depicted, the mobile core network 130 includes at least one user plane function ("UPF") 131 that serves the access network 120. The mobile core network 130 also includes multiple control plane functions including, but not limited to, an Access and Mobility Management Function ("AMF") 132, a Session Management Function ("SMF") 133, a Policy Control Function ("PCF") 134, a Network Repository Function ("NRF") 137 (used by the various NFs to discover and communicate with each other over APIs), a Network Exposure Function ("NEF") 138, and a Unified Data Management function ("UDM") 139.

Currently, when an AF is an external entity to a PLMN the interaction between the AF and the network is via a Network Exposure Function ("NEF") 138. The NEF 138 supports external exposure of capabilities of network functions including for monitoring occurrences of events. In certain embodiments, the mobile core network 130 may also include, an Authentication Server Function ("AUSF"), or other NFs defined for the 5GC.

The mobile core network 130 also includes at least one NWDAF 135 and a Data Collection Coordination Function ("DCCF") 136. As described above, the NWDAF 135 provides analytics info to the core network functions and other consuming entities. As described in further detail below, the NWDAF 135 may include an analytics generation function and/or a ML model training function. The DCCF 136 stores historical data, e.g., of the types used to derive network analytics. In certain embodiments, the DCCF 136 may act as the central data storage that collects from the Network Functions the data required by the NWDAF 135 to derive analytics. While depicted as separate from the NWDAF 135, in certain embodiments the DCCF 136 is collocated with the NWDAF 135.

Note that the mobile core network 130 may be communicatively coupled to one or more OAM platforms 140 and a ML model provider 145. The ML model provider 145 sends ML models to the NWDAF 135.

In various embodiments, the mobile core network 130 support different types of mobile data connections and different types of network slices, wherein each mobile data connection utilizes a specific network slice. Each network slice includes a set of CP and UP network functions, wherein each network slice is optimized for a specific type of service or traffic class. The different network slices are not shown in FIG. 1 for ease of illustration, but their support is assumed. In one example, each network slice includes an SMF 133 and a UPF 131, but the various network slices share the AMF 132, the PCF 134, and the UDM/UDR 139. In another example, each network slice includes an AMF 132, an SMF 133 and a UPF 131. Although specific numbers and types of network functions are depicted in FIG. 1, one of skill in the art will recognize that any number and type of network functions may be included in the mobile core network 130.

To resolve the drawbacks of analytics validity by a NWDAF 135 described above, this disclosure proposes a more efficient method for the NWDAF 135 to determine that a trained ML model used to derive analytics is not valid anymore/requires re-training, and to inform an NF that Analytics provided are out-of-date.

Figure 2A:
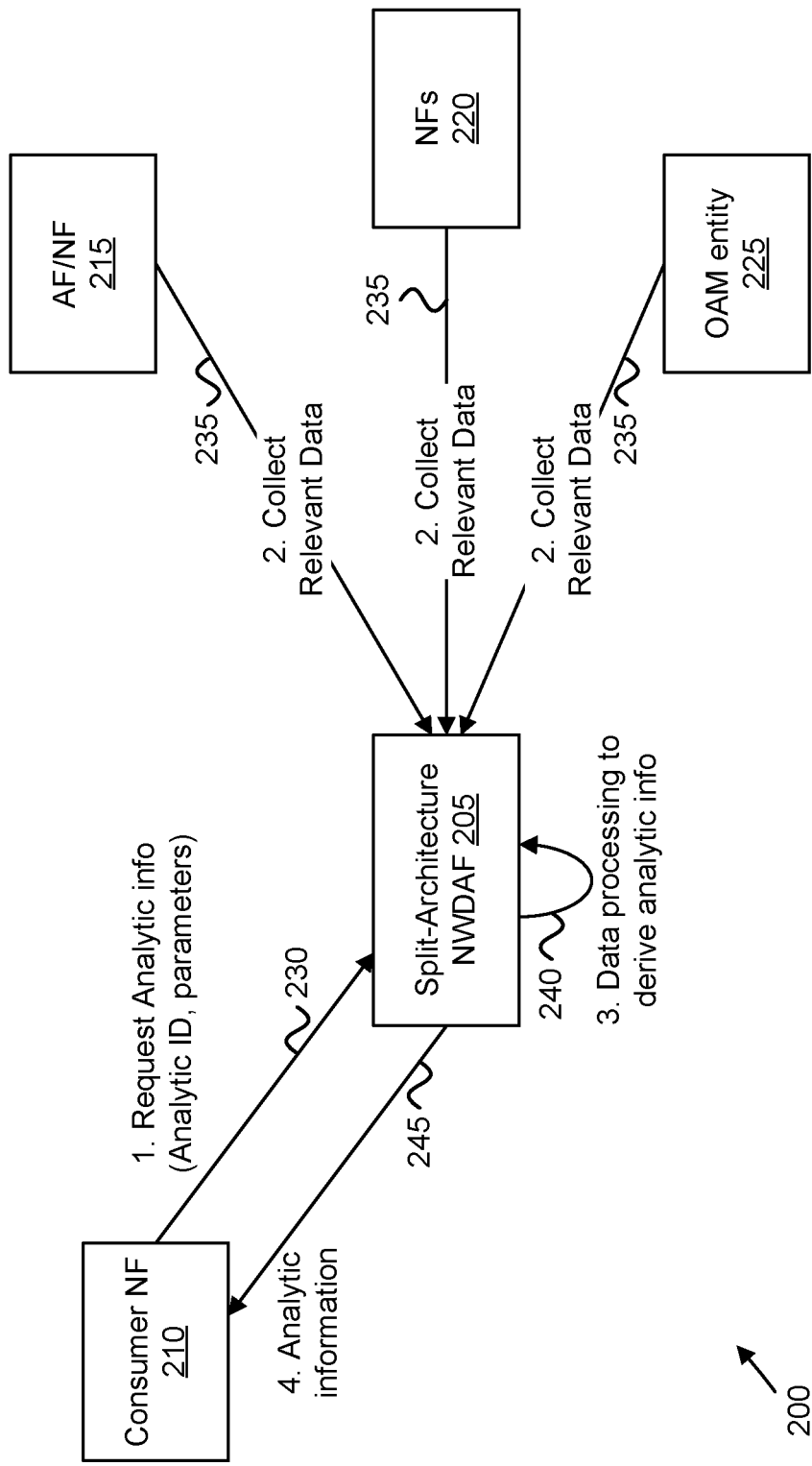
FIG. 2A is a diagram illustrating one embodiment of a NWDAF that derives analytics based on information collected by other NFs.

FIG. 2A depicts a NWDAF architecture 200 for deriving Analytics based on information collected by other NFs, according to embodiments of the disclosure. The NWDAF architecture 200 includes a Split-Architecture NWDAF 205 (which may be one embodiment of the NWDAF 135), a Consumer NF 210, one or more data producer entities capable of providing data relating to various Event IDs, depicted as the AF/NF 215, the NFs 220, and the OAM entity 225. Details of the Split-Architecture NWDAF 205 are described in further detail below, with reference to FIG. 2B.

As depicted in FIG. 2A, the Split-Architecture NWDAF 205 derives analytics based on an NF request, i.e., from the Consumer NF 210 (see messaging 230). The NF request can either be a subscription to analytics or a one-time request. In various embodiments, the NF request includes the following: 1) an Analytic ID, identifying the type of analytics requested (e.g., UE mobility analytics); 2) Analytics Filter information, which provides additional information on the analytics information required (e.g., targeting a specific Application or a Specific area of interest); 3) the Target of Analytics Reporting, which identifies whether the information is for a specific UE a group of UEs or any UE; 4) Analytic Reporting Information, which provides information on when and how the NWDAF 205 should report analytics; 5) an Analytics Target Period, which provide information whether statistics or predictions are requested; 6) one or more Reporting Thresholds, which indicate conditions on the level of each requested analytics that when reached will be notified by the NWDAF 205; 7) a preferred level of accuracy of the analytics (e.g., Low/High); and 8) a Time when the information should be provided.

The NWDAF 205 derives the analytics by collecting relevant data from NFs. The NWDAF 205 identifies the NFs 215-220 to collect the data based on the Analytic ID requested by the Consumer NF 210. For example, if UE mobility analytics are requested, then the NWDAF 205 derives statistics or predictions for UE location by subscribing from the AMF 132 to retrieve location changes events of a specific UE. The NWDAF 135 retrieves the related data from the NFs by using the Event Exposure Subscribe/Notify service operation (see messaging 235).

The NWDAF 205 perform data processing to derive analytic information (see action 240). The NWDAF 205 also provides analytic information to the consumer NF 210 (see messaging 245).

In some embodiments, a consumer NF 210 when requesting one-time analytics from the NWDAF 205 may provide an indication of the time when analytics information is needed. If the time is reached and the NWDAF 205 does not provide an answer (i.e., a response with Analytics information) the NWDAF 205 may indicate the reason for not providing a response. In addition, when a consumer NF 210 subscribes to receive periodic analytic information, the consumer NF 210 may request a preferred level of analytics of the accuracy.

In various embodiments, the NWDAF 205 may include in the response to the consumer NF the following information: 1) a Timestamp of analytics generation, which allows consumers to decide until when the received information shall be used; 2) a Validity period, which defines the time period for which the analytics information is valid; 3) a Probability assertion, i.e., confidence in the prediction, which may be based on preferred level of accuracy requested by the consumer NF. In some embodiments, a consumer NF 210 may deem a received notification from NWDAF 205 for a given feedback as invalid based on the Timestamp of analytics generation.

Figure 2B:
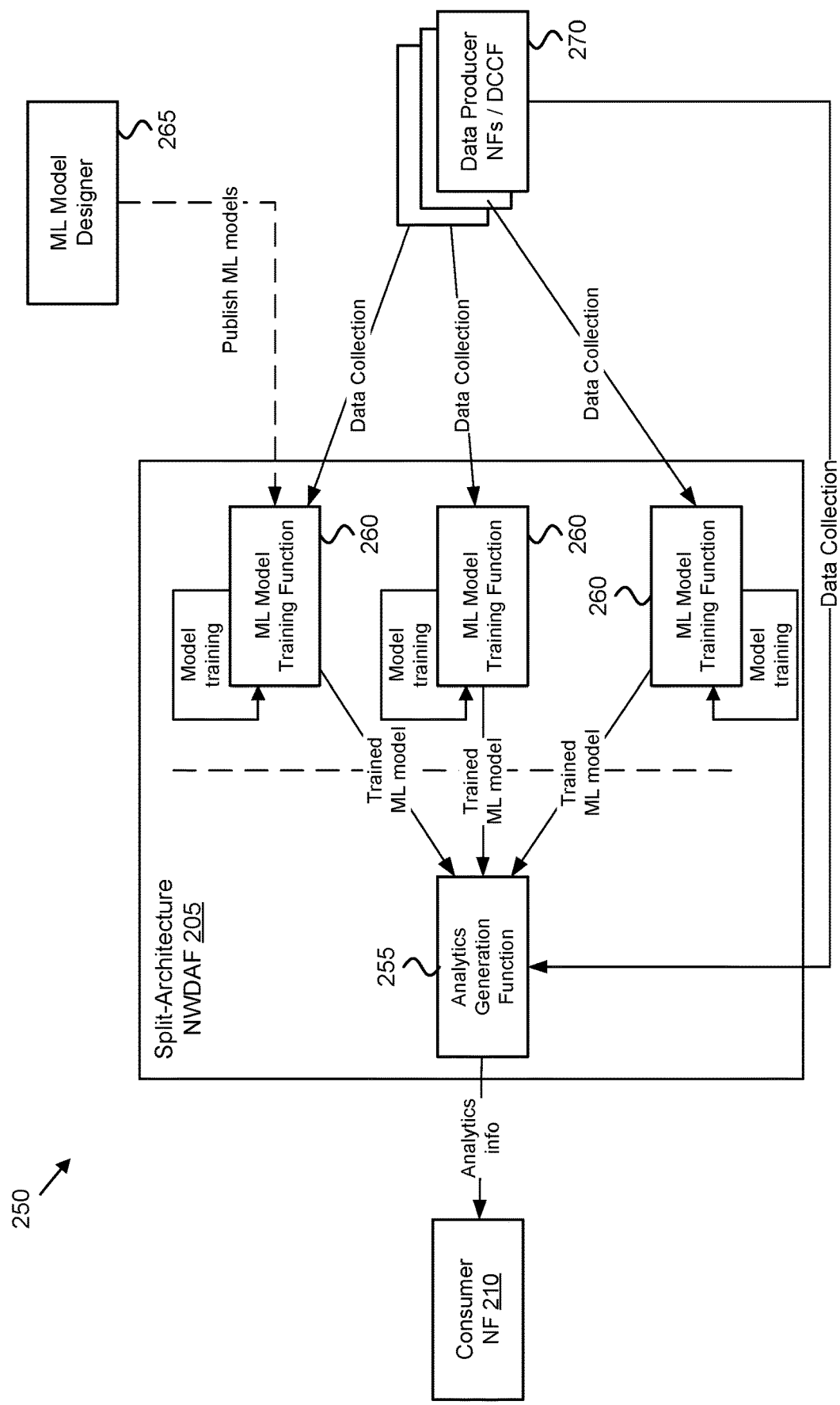
FIG. 2B is a diagram illustrating one embodiment of a network deployment for analytics generation utilizing a split-architecture NWDAF.

FIG. 2B depicts a network deployment 250 for providing Analytics feedback for a network function, according to embodiments of the disclosure. The network deployment 250 includes the Split-Architecture NWDAF 205 and the Consumer NF 210. In the depicted embodiment, the Split-Architecture NWDAF 205 includes multiple logical network functions, including the Analytics Generation Function ("AGF") NWDAF 255 and a plurality of ML Model Training Functions ("MMTF") NWDAFs 260.

In some embodiments, there may be separate NWDAF(s) 135 that have an ML Model Training Function (referred to as "MMTF-NWDAF" 260) and separate NWDAF(s) 135 that have an Analytics Generation Function (referred to as "AGF-NWDAF" 255) that use a trained ML model to derive analytics. In other embodiments, a single NWDAF 135 may support both Analytics Generation and ML Model Training functions. Thus, the AGF-NWDAF 255 and MMTF-NWDAF(s) 260 may be incorporated within a single NWDAF or in different NWDAFs.

As depicted in FIG. 2B, the ML model designer 265 (e.g., one embodiment of the ML model provider 145) provides ML models to the MMTF-NWDAFs 260, for example by publishing the ML models. In certain embodiments, the MMTF-NWDAFs 260 subscribe to the ML model designer 265 in order to receive notification of new/updated ML models.

To derive network analytics, the MMTF-NWDAF 260 receives initial ML models from an ML model Designer 265 and collects data from Data Producer NFs (e.g., location information from AMF). Additionally, and/or alternatively, the MMTF-NWDAF 260 may receive historical data from a DCCF 136 to train the model. The data producer entities from FIG. 2A (e.g., the AF/NF 215, the NFs 220, and the OAM entity 225) and DCCF are represented by elements 270.

The AGF-NWDAF 255 receives the trained ML models from the MMTF-NWDAFs 260 and uses the trained model—plus, optionally new data from Data Producer NF(s)/DCCF 270—to derive requested analytics. The AGF-NWDAF 255 may subscribe to the MMTF-NWDAF 260 to receive trained ML models, e.g., using a specific API. The AGF-NWDAF 255 subscribes based on an analytics request from a Consumer NF 210. Note that an ML model is linked to one Analytic Output, i.e. linked to a specific Analytic ID. Note that Nnwdaf services are used for the AGF-NWDAF 255 and/or MMTF-NWDAF to provide specific analytics information. In certain embodiments, the analytics information is statistical information of past events. In other embodiments, the analytics information is predictive information.

The main embodiments of the proposed solution are as follows:

A consumer NF 210 may subscribe to an AGF-NWDAF 255 to be notified of Analytics Feedback, i.e., if a previously provided analytic information becomes out-of-date or is invalid (for example, validity period changes or confidence level changes). The AGF-NWDAF 255 may subscribe to a MMTF-NWDAF 260 to be notified if a previously provided trained ML model is out of date or invalid. The trigger for the AGF-NWDAF 255 to subscribe to such notifications is not dependent on a request from a consumer NF 210. The MMTF-NWDAF 260 may determine an ML model is out of date or not valid and needs to be re-trained under the following cases:

Case 1: The MMTF-NWDAF 260 determines that the validity of data collected to train the ML model has changed. Here, the MMTF-NWDAF 260 may determine that data collected are not valid when:

a. When data are collected to derive analytics or train an ML model for NF load analytics, an OAM platform may change the resources for a Network Function by changing the "NF Resource Usage" that affects its Load status. In one embodiment, the Load status may be as described in Table 6.5.2-1 of 3GPP TS 23.288.

b. When data are collected to derive analytics or train an ML model for UE communication pattern, an AF can indicate when the provided Expected UE Communication Pattern expires. In one embodiment, the indication may be as described in Table 6.1.6.2.49-1 of 3GPP TS 29.503. Alternatively, the AF may provide an updated Expected UE Communication Pattern before the current one expires.

c. An AF when providing input data for Observed Service Experience, the AF may provide updated Locations of application represented by a list of DNAI(s). In one embodiment, as described in Table 6.4.2-1 of 3GPP TS 23.288.

d. An NWDAF may receive indication that service parameters have changed. For example, a DNN name or S-NSSAI has been updated.

Case 2: The MMTF-NWDAF 260 may receive from the ML Model Designer 265 an updated initial ML model that replaces the current trained ML model. When the MMTF-NWDAF 260 determines that the ML model needs re-training, the MMTF-NWDAF 260 starts training the new ML model. If the MMTF-NWDAF 260 determines that historical data are valid the MMTF-NWDAF 260 may subscribe to collect cached data from the DCCF 136. If the MMTF-NWDAF 260 determines that new data is required because the cached data are invalid the MMTF-NWDAF 260 may subscribe to request new data from Data Producer NF(s)/DCCF 270. The MMTF-NWDAF 260 determines the NFs and/or OAM entities to collect the data based on the Analytic ID of the ML model.

Note that the OAM platform is a part of a wireless communication network, and interacts with the mobile core network. The OAM platform has five main functions related to: fault, configuration, accounting, performance, and security. The three main entities of the OAM architecture are: network elements (these manage e.g., multiple RAN nodes), element managers ("EM") (these manage a collection of elements of the same type (MMEs, S-GWs, P-GWs, etc.)), and network managers ("NMs") (these manage multiple element managers).

The element management system ("EMS") is responsible of the functions of each network element and enforces quality of service ("QoS") demands. The network management system ("NMS") offers a wide array of network management information, ranging from the elements' capabilities, automation, malfunction information, etc.

In various embodiments, the MMTF-NWDAF 260 may inform the AGF-NWDAF 255 that the previously provided trained ML model is not valid/out of date and may inform the AGF-NWDAF 255 when a new trained ML model will be available. When the new trained ML model is available, the MMTF-NWDAF 260 provides the updated ML model to the AGF-NWDAF 255. The information may include parameters such as validity period of the ML model.

When the AGF-NWDAF 255 receives notification that the model is not valid it may decide to query other MMTF-NWDAFs 260 if there is an up to date trained ML model or may wait for the current MMTF-NWDAF 260 to provide the new data. The AGF-NWDAF 255 may query the NRF 137 to obtain information if there are other MMTF-NWDAF 260 that contained the required ML model according to the Analytics requested by a consumer NF 210. The AGF-NWDAF 255 informs the consumer NF 210 that the previously provided analytics are invalid and may include information when the new analytic data will be available.

The AGF-NWDAF 255 may also determine that the data collected from Data Producer NFs/DCCF 270 that are used in conjunction with the trained ML model are not valid/out of date. In such a case, the AGF-NWDAF 255 may also notify the Consumer NF 210. Based on the feedback of the AGF-NWDAF 255, the consumer NF 210 may not make an action based on previously provided analytics until the NWDAF 205 provides updated information.

Figure 3A:
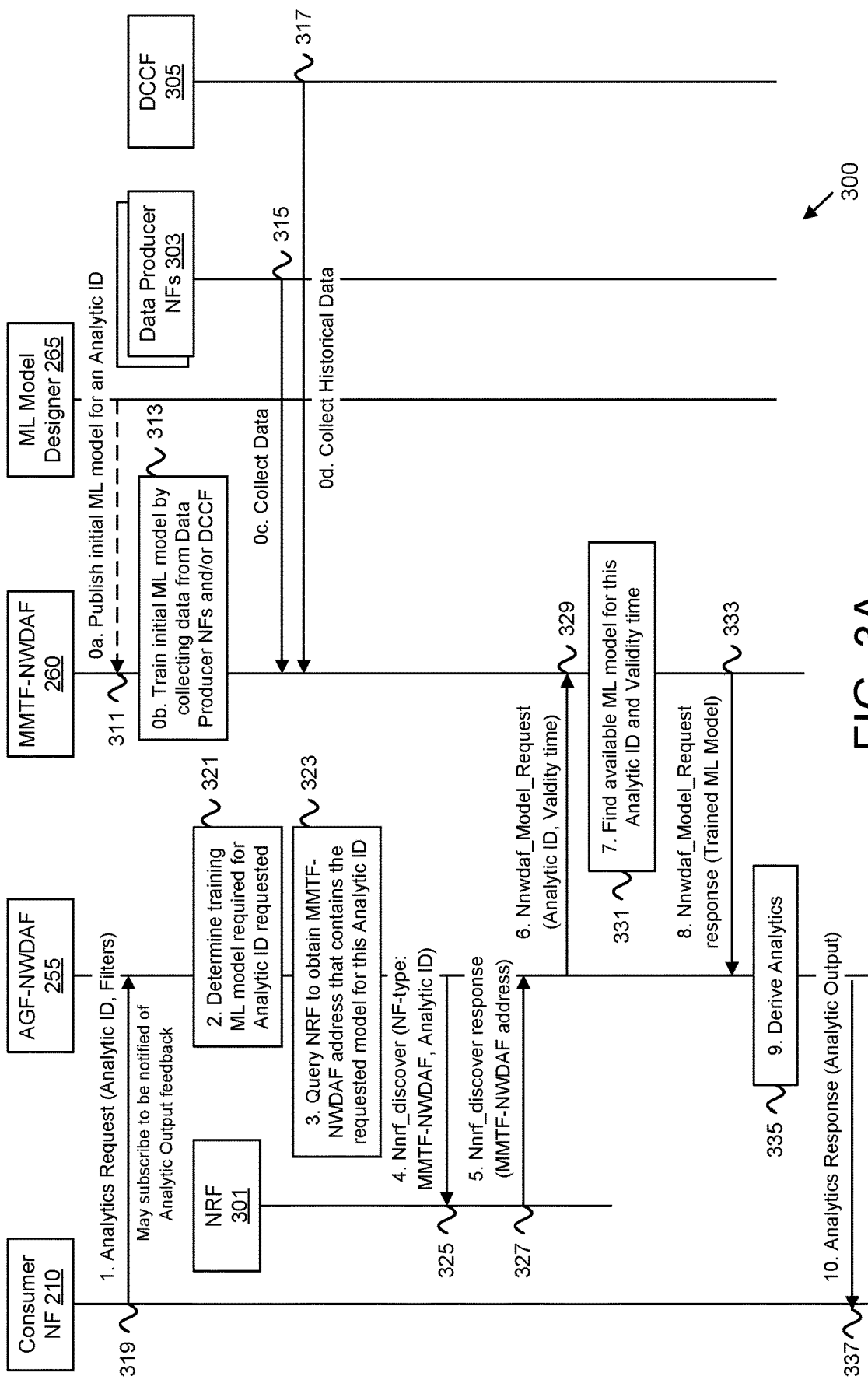
FIG. 3A is a signal flow diagram illustrating one embodiment of a procedure for providing Analytics feedback for a network function.
Figure 3B:
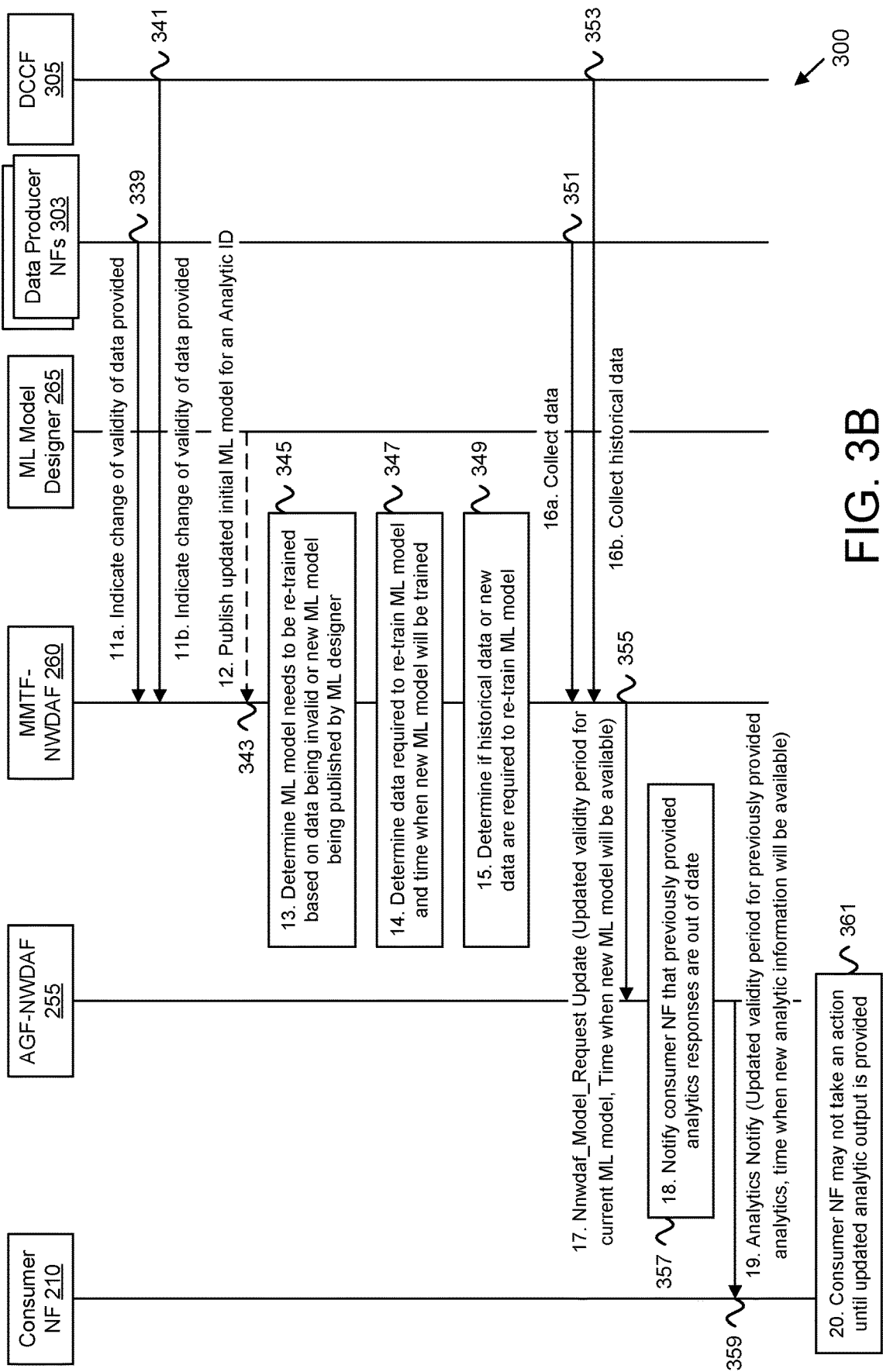
FIG. 3B is a continuation of the procedure depicted in FIG. 3A.

FIGS. 3A-3B depict a procedure 300 for providing Analytics feedback for a network function, according to embodiments of the disclosure. The procedure 300 involves a consumer NF 210 (e.g., a NF requesting analytic information), a AGF-NWDAF 255, a NRF 301, a MMTF-NWDAF 260, the ML model designer 265, one or more Data Producer NFs 303 (e.g., an AMF, SMF, AF, etc.), and a DCCF 305. The procedure 300 details signaling flow for a Split-Architecture NWDAF 205 to provide Analytics validity feedback to a NF, such as the consumer NF 210.

The procedure 300 begins at Step 0a as the ML model designer function 265 sends an initial ML model to the MMTF-NWDAF 260 (see messaging 311). At Step 0b, the MMTF-NWDAF 260 trains the ML model based on data collected by Data Producer NFs 303 (e.g., AMF, UPF, etc., see block 313).

At Step 0c, the MMTF-NWDAF 260 collects the relevant data from the Data Producer NFs 303 (see messaging 315). Additionally, an/or alternatively, at Step 0d the MMTF-NWDAF collects historical data from the DCCF 305 (see messaging 317). Note that Steps 0a to 0c may take place before a consumer NF 210 requests analytics.

At Step 1, a consumer NF 210 requests analytics from an AGF-NWDAF 255 (see messaging 319). In some embodiments, the consumer NF 210 may subscribe to notifications of Analytic Output feedback, i.e. provide feedback whether previously provided analytics validity time or confidence level changes.

In certain embodiments, the consumer NF 210 may subscribe to notifications of Analytic Output Feedback, e.g., by sending an Nnwdaf_AnalyticsSubscription_Subscribe request. Said request may include, as thresholds, to report if Analytics validity period or confidence level changes. In another embodiment, the Consumer NF 210 may include in a Nnwdaf_AnalyticsInfo_Request request an "Analytic Output Feedback" flag that, if set, is a request to the AGF-NWDAF 255 to report if validity period or confidence level of previously provided analytics has changed.

At Step 2, the AGF-NWDAF 255 determines the training ML model required based on the requested Analytic ID (see block 321).

At Step 3, the AGF-NWDAF 255 queries the NRF 301 to determine the MMTF-NWDAF 260 to collect the trained ML model (see block 323).

At Step 4, the AGF-NWDAF 255 sends an Nnrf_discovery request including the NF-type set to the NRF 301 and may also include the Analytic ID for the requested ML model (see messaging 325).

At Step 5, the NRF 301 provides a list of MMTF-NWDAFs 260 that contains trained ML models for this Analytic ID (see messaging 327).

At Step 6, the AGF-NWDAF 255 requests the ML model from the MMTF-NWDAF 260 using a new service-based Nnwdaf procedure, e.g., sending a Nnwdaf_Model_Request message (see messaging 329). The AGF-NWDAF 255 includes the Analytic ID in the Model Request. The AGF-NWDAF 255 may also include a validity time for the requested trained ML Model. The validity time may be based on the validity time of the analytics requested by the Consumer NF 210 in step 1. In addition, the AGF-NWDAF 255 may subscribe to be notified by the MMTF-NWDAF 260 to be informed of updated ML model for this Analytic ID or if the validity time of the previously provided ML Model changes.

At Step 7, the MMTF-NWDAF 260 determines the ML model required based on the Analytic ID requested and the Validity Time, if included in step 6 (see block 331).

At Step 8, the MMTF-NWDAF provides the trained ML model to the AGF-NWDAF (see messaging 333).

At Step 9, the AGF-NWDAF derives analytics based on the ML model (see block 335).

At Step 10, the AGF-NWDAF provides requested analytics to the consumer NF 210 (see messaging 337).

Continuing on FIG. 3B at Step 11a, the Data Producer NFs may indicate that the validity time of data provided previously has changed, e.g., as described in Case 1 (see messaging 339).

At Step 11b, the DCCF may indicate that the validity time of data provided previously has changed, e.g., as described in Case 1 (see messaging 341).

At Step 12, an ML Designer Function 265 may provide an updated ML model identified by an Analytic ID to the MMTF-NWDAF 260, e.g., as described in Case 2 (see messaging 343).

At Step 13, the MMTF-NWDAF 260 determines that an ML model needs to be retrained, e.g., either due to an updated model provided by an ML Designer function 265 or by determining a change of the validity of previously collected data that were used to train an ML model (see block 345).

At Step 14, the MMTF-NWDAF 260 determines the data required to re-train the ML model based on the Analytic ID of the ML model (see block 347).

At Step 15, the MMTF-NWDAF 260 determines if historical data collected or new data from Data Producer NFs 303 should be collected (see block 349). If the MMTF-NWDAF 260 determines that new data is required, e.g., because the cached data are invalid, then the MMTF-NWDAF 260 may subscribe to request new data from Data Producer NFs 303 or DCCF 305. However, if the MMTF-NWDAF 260 determines that historical data are valid, then the MMTF-NWDAF 260 may subscribe to collect cached data from the DCCF 305. Note that the MMTF-NWDAF 260 determines the NFs to collect the data based on the Analytic ID of the ML model.

At Step 16a, according to the determination at Step 15, the MMTF-NWDAF collects new data from the Data Producer NFs 303 (see messaging 351).

At Step 16b, according to the determination at Step 15, the MMTF-NWDAF collects historical data or new data from the DCCF 305 (see messaging 353).

At Step 17, the MMTF-NWDAF 260 retrains the ML model and may notify an AGF-NWDAF 255 that the validity time of a previously provided ML model has changed (if the AGF-NWDAF 255 has subscribed to receive those notifications) (see messaging 355). The MMTF-NWDAF may also indicate time when new trained ML model will be available.

At Step 18, the AGF-NWDAF 255 determines to notify the consumer NF 210 that validity or confidence level of previously provided analytics information has changed (see block 357). Accordingly, at Step 19, the AGF-NWDAF 255 notifies the Consumer NF 210 (see messaging 359). In some embodiments, the notification from the AGF-NWDAF 255 may include a reason (e.g. ML model or data invalid) and may also indicate when updated analytic data will be available.

At Step 20, the Consumer NF 210 may not take any action based on previously provided analytic information and may wait for updated analytic information before taking any actions (see block 361).

Figure 4:
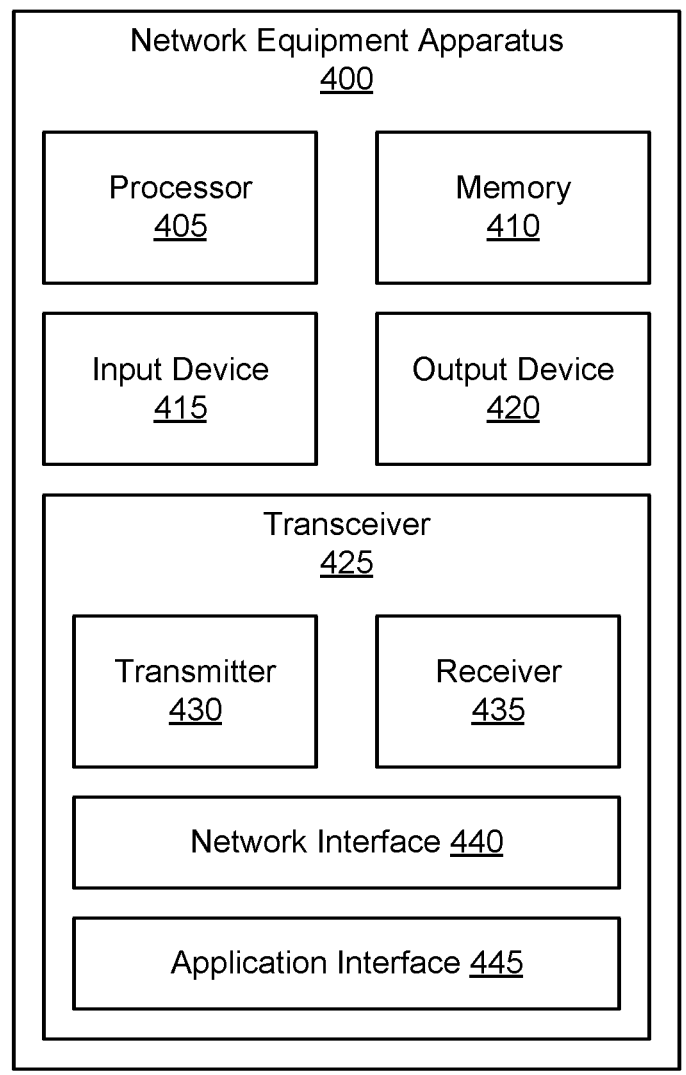
FIG. 4 is a block diagram illustrating one embodiment of a network equipment apparatus.

FIG. 4 depicts one embodiment of a network equipment apparatus 400 that may be used for providing Analytics feedback for a network function, according to embodiments of the disclosure. In some embodiments, the network equipment apparatus 400 may be one embodiment of a data analytics function, such as the NWDAF 135, the split-architecture NWDAF 205, and/or the MMTF-NWDAF 260. Furthermore, network equipment apparatus 400 may include a processor 405, a memory 410, an input device 415, an output device 420, a transceiver 425.

In some embodiments, the input device 415 and the output device 420 are combined into a single device, such as a touch screen. In certain embodiments, the network equipment apparatus 400 does not include any input device 415 and/or output device 420. In various embodiments, the network equipment apparatus 400 may include one or more of: the processor 405, the memory 410, and the transceiver 425, and does not include the input device 415 and/or the output device 420.

As depicted, the transceiver 425 includes at least one transmitter 430 and at least one receiver 435. Here, the transceiver 425 communicates with one or more network functions in the mobile communication network (e.g., PLMN). Additionally, the transceiver 425 may support at least one network interface 440 and/or application interface 445. The application interface(s) 445 may support one or more APIs. The network interface(s) 440 may support 3GPP reference points, such as the N23 reference point. Other network interfaces 440 may be supported, as understood by one of ordinary skill in the art. In some embodiments, the transceiver 425 supports different interfaces 440 for communicating with the various network functions in a mobile core network (e.g., a 5GC).

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425.

In various embodiments, the processor 405 controls the network equipment apparatus 400 to implement the above described NWDAF behaviors. For example, via the network interface 440 and/or application interface 445, the processor 405 receives a first request for a trained ML model from a NF that supports analytics generation (e.g., an AGF-NWDAF). Here, the first request contains first information including an Analytic ID. In some embodiments, the NF sends the first request based on an Analytics Request sent by a Consumer NF. In some embodiments, the first information includes a first validity time for a ML model. In some embodiments, the first request includes a subscription request, the subscription request indicating that the NF is to be notified if the validity of ML model changes or if a new trained ML model for the analytic ID is generated.

The processor 405 determines a first trained ML model based on the first information and provides the first trained ML model to the NF (e.g., via the network interface 440 and/or application interface 445). The processor 405 determines that the first trained ML model is invalid and notifies the NF that the validity of the first trained ML model has changed. In certain embodiments, determining that the first trained ML model is invalid includes determining a validity time of data collected to train the first trained ML model. In certain embodiments, the validity time of the collected data is based on a validity time indicated in the Analytics Request sent by the Consumer NF.

In some embodiments, the first training ML model is determined to be invalid based on receiving a first indication. In such embodiments, the first indication indicates that an updated initial ML model for the Analytic ID is available and/or indicates that the validity of data used to train the first trained ML model has changed or expired. Note that a NF may indicate the time where the validity of the data expires. In certain embodiments, the first indication is derived based on configuration changes executed by an entity, the entity comprising at least one of an OAM platform and an AF. Note that the OAM platform may indicate changes related to communication service, network slice, network slice subnet, NF or managed entity provisioning or modification. The OAM platform may also provide an updated ML model. The AF may indicate UE configuration changes.

In various embodiments, upon determining that the first trained ML model is invalid, the processor 405 trains a second ML model by collecting data from a first list of one or more network entities based on the Analytic ID included in the first information, each of the one or more network entities being a core Network Function or an OAM platform entity. In such embodiments, the notification that the validity of the first trained ML model has changed includes a notification indicating that the second trained ML model is available.

In some embodiments, collecting data from the list of one or more network entities includes subscribing to either a DCCF or the first list of one or more network entities, the subscription for a second list of one or more Events. In such embodiments, the Analytic ID identifies the second list of one or more Events. Note that the requested Analytic ID may identify 1) the Events to subscribe to for the collection of data, and 2) the type(s) of NF to collect the Events from. Upon occurrence of a subscribed event, the subscribed entity (i.e., of the first list) sends a notification of the subscription to the network equipment apparatus 400. In certain embodiments, the notification of the subscription includes the data required to train the ML model.

In some embodiments, the processor 405 training the second ML model includes determining whether a validity time of the data collected to train the first ML model is different than the first validity time included in the first information. In response to the validity time of the data collected to train the first ML model being different than the first validity time, the processor 405 may collect new data from the first list of one or more network entities.

In some embodiments, the processor 405 training the second ML model includes determining whether a new ML is available. In response to receiving an indication that a new ML model is available, and based on the validity time of the data stored in a DCCF, the processor 405 may request data stored in a DCCF for training the second ML model.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to providing Analytics feedback for a network function, for example storing ML models, training data, Analytics IDs, lists of Events to monitor, occurrence of Events, Event filters, monitoring/reporting subscriptions, subscription targets, subscription IDs, NF profiles, and the like. In certain embodiments, the memory 410 also stores program code and related data, such as an operating system ("OS") or other controller algorithms operating on the network equipment apparatus 400 and one or more software applications.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, may include any known electronically controllable display or display device. The output device 420 may be designed to output visual, audible, and/or haptic signals. In some embodiments, the output device 420 includes an electronic display capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, all or portions of the output device 420 may be located near the input device 415.

As discussed above, the transceiver 425 may communicate with one or more remote units and/or with one or more interworking functions that provide access to one or more PLMNs. The transceiver 425 may also communicate with one or more network functions (e.g., in the mobile core network 130). The transceiver 425 operates under the control of the processor 405 to transmit messages, data, and other signals and also to receive messages, data, and other signals. For example, the processor 405 may selectively activate the transceiver (or portions thereof) at particular times in order to send and receive messages.

The transceiver 425 may include one or more transmitters 430 and one or more receivers 435. In certain embodiments, the one or more transmitters 430 and/or the one or more receivers 435 may share transceiver hardware and/or circuitry. For example, the one or more transmitters 430 and/or the one or more receivers 435 may share antenna(s), antenna tuner(s), amplifier(s), filter(s), oscillator(s), mixer(s), modulator/demodulator(s), power supply, and the like. In one embodiment, the transceiver 425 implements multiple logical transceivers using different communication protocols or protocol stacks, while using common physical hardware.

Figure 5:
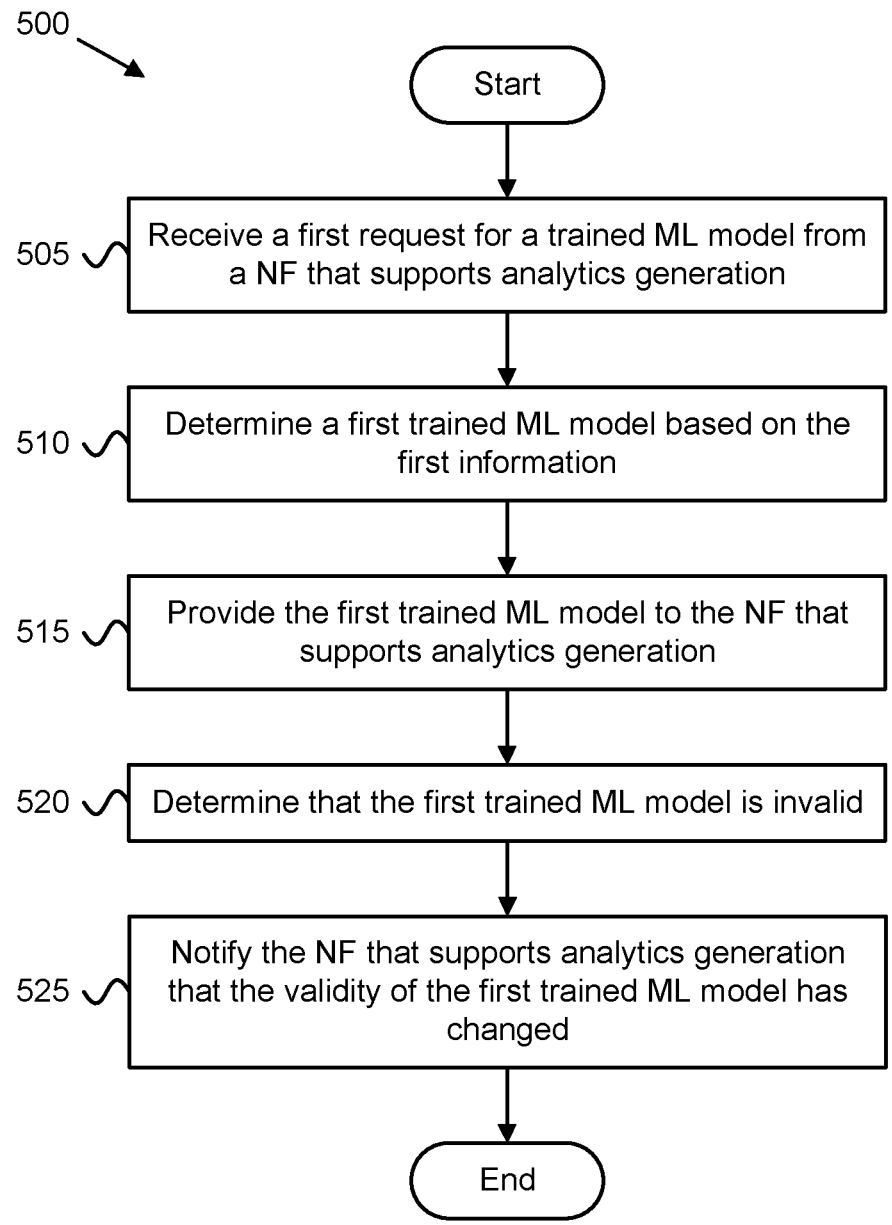
FIG. 5 is a flow chart diagram illustrating one embodiment of a method for providing Analytics feedback for a network function.

FIG. 5 depicts one embodiment of a method 500 for providing Analytics feedback for a network function, according to embodiments of the disclosure. In various embodiments, the method 500 is performed by a NWDAF that supports ML model training for one or more Analytic ID(s), such as the NWDAF 135, the split-architecture NWDAF 205, the MMTF-NWDAF 260 and/or the network equipment apparatus 400, described above. In some embodiments, the method 500 is performed by a processor, such as a microcontroller, a microprocessor, a CPU, a GPU, an auxiliary processing unit, a FPGA, or the like.

The method 500 begins and receives 505 a first request for a trained ML model from a NF that supports analytics generation (e.g., from an AGF-NWDAF 255). Here, the first request contains first information including an Analytic ID. The method 500 includes determining 510 a first trained ML model based on the first information. The method 500 includes providing 515 the first trained ML model to the NF that supports analytics generation. The method 500 includes determining 520 that the first trained ML model is invalid. The method 500 includes notifying 525 the NF that supports analytics generation that the validity of the first trained ML model has changed. The method 500 ends.

Disclosed herein is a first apparatus for providing Analytics feedback for a network function, according to embodiments of the disclosure. The first apparatus may be implemented by a first NF, e.g., that supports ML model training for one or more Analytic ID(s), such as the NWDAF 135, the split-architecture NWDAF 205, the MMTF-NWDAF 260 and/or the network equipment apparatus 400, described above. The first apparatus includes a network interface that receives a first request for a trained ML model from a second NF that supports analytics generation, the first request containing first information including an Analytic ID. The first apparatus includes a processor that determines a first trained ML model based on the first information and provides the first trained ML model to the second NF. The processor determines that the first trained ML model is invalid and notifies the second NF that the validity of the first trained ML model has changed.

In various embodiments, upon determining that the first trained ML model is invalid, the processor trains a second ML model by collecting data from a first list of one or more network entities based on the Analytic ID included in the first information, each of the one or more network entities being a core Network Function or an OAM platform entity. In such embodiments, the notification that the validity of the first trained ML model has changed includes a notification indicating that the second trained ML model is available.

In some embodiments, collecting data from the list of one or more network entities includes subscribing for a second list of one or more Events from either a DCCF or the first list of one or more network entities, and receiving a notification of the subscription. In such embodiments, the Analytic ID identifies the second list of one or more Events. In certain embodiments, the notification of the subscription contains the data required to train the ML model.

In some embodiments, training the second ML model includes collecting new data from the first list of one or more network entities in response to a validity time of the data collected to train the first ML model being different to a validity time included in the first information of the first request. In some embodiments, training the second ML model includes requesting data stored in a DCCF in response to receiving an indication that a new ML model is available and based on the validity time of the data stored in a DCCF.

In some embodiments, the second NF sends the first request based on an Analytics Request sent by a Consumer NF. In some embodiments, the first information includes a validity time for a ML model. In such embodiments, determining that the first trained ML model is invalid includes determining a validity time of data collected to train the first trained ML model. In certain embodiments, the validity time is based on a first validity time indicated in an Analytics Request sent by a Consumer NF.

In some embodiments, the first training ML model is determined to be invalid based on receiving a first indication. In such embodiments, the first indication indicates that an updated initial ML model for the Analytic ID is available and/or indicates that the validity of data used to train the first trained ML model has changed or expired. In one embodiment, an NF may indicate the time when the validity of data it has provided will expire.

In certain embodiments, the first indication is derived based on configuration changes executed by an entity, the entity comprising at least one of an OAM platform and an AF. In one embodiment, the OAM platform indicates changes related to communication service, network slice, network slice subnet, NF or managed entity provisioning or modification. In another embodiment, the OAM platform provides and updated ML model to the first NF. In one embodiment, the AF may indicate UE configuration changes to the first NF.

In some embodiments, the first request includes a subscription request, the subscription request indicating that the second NF is to be notified if the validity of ML model changes or if a new trained ML model for the analytic ID is generated. In some embodiments, the first NF and second NF are logical network functions that may be incorporated within a single NWDAF. In other embodiments, the first NF and second NF are logical network functions that are incorporated in different NWDAFs.

Disclosed herein is a first method for providing Analytics feedback for a network function, according to embodiments of the disclosure. The first method may be performed by a first NF, e.g., that supports ML model training for one or more Analytic ID(s), such as the NWDAF 135, the split-architecture NWDAF 205, the MMTF-NWDAF 260 and/or the network equipment apparatus 400, described above. The first method includes receiving a first request for a trained ML model from a second NF that supports analytics generation, the first request containing first information including an Analytic ID. The first method includes determining a first trained ML model based on the first information and providing the first trained ML model to the second NF. The first method includes determining that the first trained ML model is invalid and notifying the second NF that the validity of the first trained ML model has changed.

In various embodiments, the first method further includes training a second ML model upon determining that the first trained ML model is invalid, where training the second ML model includes collecting data from a first list of one or more network entities based on the Analytic ID included in the first information, each of the network entities being either a Network Function (i.e., in the core network) or a OAM platform entity. In such embodiments, the notification that the validity of the first trained ML model has changed may include a notification indicating that the second trained ML model is available.

In some embodiments, collecting data from the first list of one or more network entities includes subscribing for a second list of one or more Events, e.g., from either a DCCF or from the first list of one or more network entities, and receiving a notification of the subscription. In such embodiments, the Analytic ID is used to identify the second list of one or more Events. In certain embodiments, the notification of the subscription includes the data required to train the ML model.

In some embodiments, in response to a validity time of the data collected to train the first ML model being different to a validity time included in the first information of the first request, training the second ML model includes collecting new data from the first list of one or more network entities. In some embodiments, training the second ML model includes requesting data stored in a DCCF in response to receiving an indication that a new ML model is available, the requesting also based on the validity time of the data stored in a DCCF.

In some embodiments, the second NF sends the first request based on an Analytics Request sent by a Consumer NF. In some embodiments, the first information includes a validity time for a ML model. In such embodiments, determining that the first trained ML model is invalid includes determining a validity time of data collected to train the first trained ML model. In certain embodiments, the validity time is based on a first validity time indicated in an Analytics Request sent by a Consumer NF.

In some embodiments, the first training ML model is determined to be invalid based on receiving a first indication. In such embodiments, the first indication indicates that an updated initial ML model for the Analytic ID is available and/or indicates that the validity of data used to train the first trained ML model has changed or expired. In one embodiment, an NF may indicate the time when the validity of data it has provided will expire.

In certain embodiments, the first indication is derived based on configuration changes executed by an entity, the entity comprising at least one of an OAM platform and an AF. In one embodiment, the OAM platform indicates changes related to communication service, network slice, network slice subnet, NF or managed entity provisioning or modification. In another embodiment, the OAM platform provides and updated ML model to the first NF. In one embodiment, the AF may indicate UE configuration changes to the first NF.

In some embodiments, the first request includes a subscription request, the subscription request indicating that the second NF is to be notified if the validity of ML model changes or if a new trained ML model for the analytic ID is generated. In some embodiments, the first NF and second NF are logical network functions that may be incorporated within a single NWDAF. In other embodiments, the first NF and second NF are logical network functions that are incorporated in different NWDAFs.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a first network function ("NF"), the method comprising:
   receiving a first request for a trained machine learning ("ML") model from a second NF that supports analytics generation, the first request comprising first information including an Analytic ID;
   determining a first trained ML model based on the first information;
   providing the first trained ML model to the second NF;
   determining that the first trained ML model is invalid; and
   notifying the second NF that a validity of the first trained ML model has changed.

2. The method of claim 1, further comprising training a second ML model in response to determining that the first trained ML model is invalid, wherein training the second ML model comprises collecting data from a first list of one or more network entities based on the Analytic ID included in the first information, each of the one or more network entities being a core Network Function or an Operation Administration and Management ("OAM") platform, wherein notifying that the validity of the first trained ML model has changed comprises providing a notification indicating that the second trained ML model is available.

3. The method of claim 2, wherein collecting data from a list of one or more network entities comprises subscribing for a second list of one or more Events from either a Data Coordination Control Function ("DCCF") or the first list of one or more network entities, wherein the Analytic ID identifies the second list of one or more Events.

4. The method of claim 2, wherein training the second ML model comprises collecting new data from the first list of one or more network entities in response to a validity time of the data collected to train the first ML model being different to a validity time included in the first information of the first request.

5. The method of claim 2, wherein training the second ML model comprises requesting data stored in a Data Coordination Control Function ("DCCF") in response to receiving an indication that a new ML model is available and based on a validity time of the data stored in a DCCF.

6. The method of claim 1, wherein the first information comprises a validity time for a ML model, wherein determining that the first trained ML model is invalid comprises determining a validity time of data collected to train the first trained ML model.

7. The method of claim 1, wherein the first request includes a subscription request, the subscription request indicating that the second NF is to be notified if the validity of ML model changes or if a new trained ML model for the analytic ID is generated.

8. The method of claim 1, wherein the first training ML model is determined to be invalid based on receiving a first indication, wherein the first indication indicates that an updated initial ML model for the Analytic ID is available and/or that the validity of data used to train the first trained ML model changed or expired.

9. The method of claim 8, wherein the first indication is derived based on configuration changes executed by an entity the entity comprising at least one of an Operation Administration and Management ("OAM") platform and an application function ("AF").

10. The method of claim 1, wherein the first NF and second NF are logical network functions that may be incorporated within a single Network Data Analytics Function ("NWDAF").

11. An apparatus comprising:
a network interface that receives a first request for a trained machine learning ("ML") model from a network function ("NF") that supports analytics generation, the first request comprising first information including an Analytic ID; and
a processor that:
determines a first trained ML model based on the first information;
provides the first trained ML model to the NF;
determines that the first trained ML model is invalid; and
notifies the NF that a validity of the first trained ML model has changed.

12. The apparatus of claim 11, wherein in response to determining that the first trained ML model is invalid the processor trains a second ML model by collecting data from a first list of one or more network entities based on the Analytic ID included in the first information, each of the one or more network entities being a core Network Function or an OAM platform entity, wherein the processor notifies that the validity of the first trained ML model has changed by providing a notification indicating that the second trained ML model is available.

13. The apparatus of claim 12, wherein collecting data from the list of one or more network entities comprises subscribing for a second list of one or more Events from either a Data Coordination Control Function ("DCCF") or the first list of one or more network entities, wherein the Analytic ID identifies the second list of one or more Events.

14. The apparatus of claim 12, wherein training the second ML model comprises collecting new data from the first list of one or more network entities in response to a validity time of the data collected to train the first ML model being different to a validity time included in the first information of the first request.

15. The apparatus of claim 12, wherein training the second ML model comprises requesting data stored in a Data Coordination Control Function ("DCCF") in response to receiving an indication that a new ML model is available and based on a validity time of the data stored in a DCCF.

16. The apparatus of claim 11, wherein the first information comprises a validity time for a ML model, wherein determining that the first trained ML model is invalid comprises determining a validity time of data collected to train the first trained ML model.

17. The apparatus of claim 11, wherein the first request includes a subscription request, the subscription request indicating that the NF is to be notified if the validity of ML model changes or if a new trained ML model for the analytic ID is generated.

18. The apparatus of claim 11, wherein the first training ML model is determined to be invalid based on receiving a first indication, wherein the first indication indicates that an updated initial ML model for the Analytic ID is available and/or indicates that the validity of data used to train the first trained ML model has changed or expired.

19. The apparatus of claim 18, wherein the first indication is derived based on configuration changes executed by an entity, the entity comprising at least one of an OAM platform and an application function ("AF").

20. The apparatus of claim 11, wherein the first network function and second network function are logical network functions that may be incorporated within a single Network Data Analytics Function ("NWDAF").

* * * * *